July 14, 1931.  E. DE H. CALDWELL  1,814,545
VALVE GEAR
Filed March 11, 1927  4 Sheets-Sheet 1
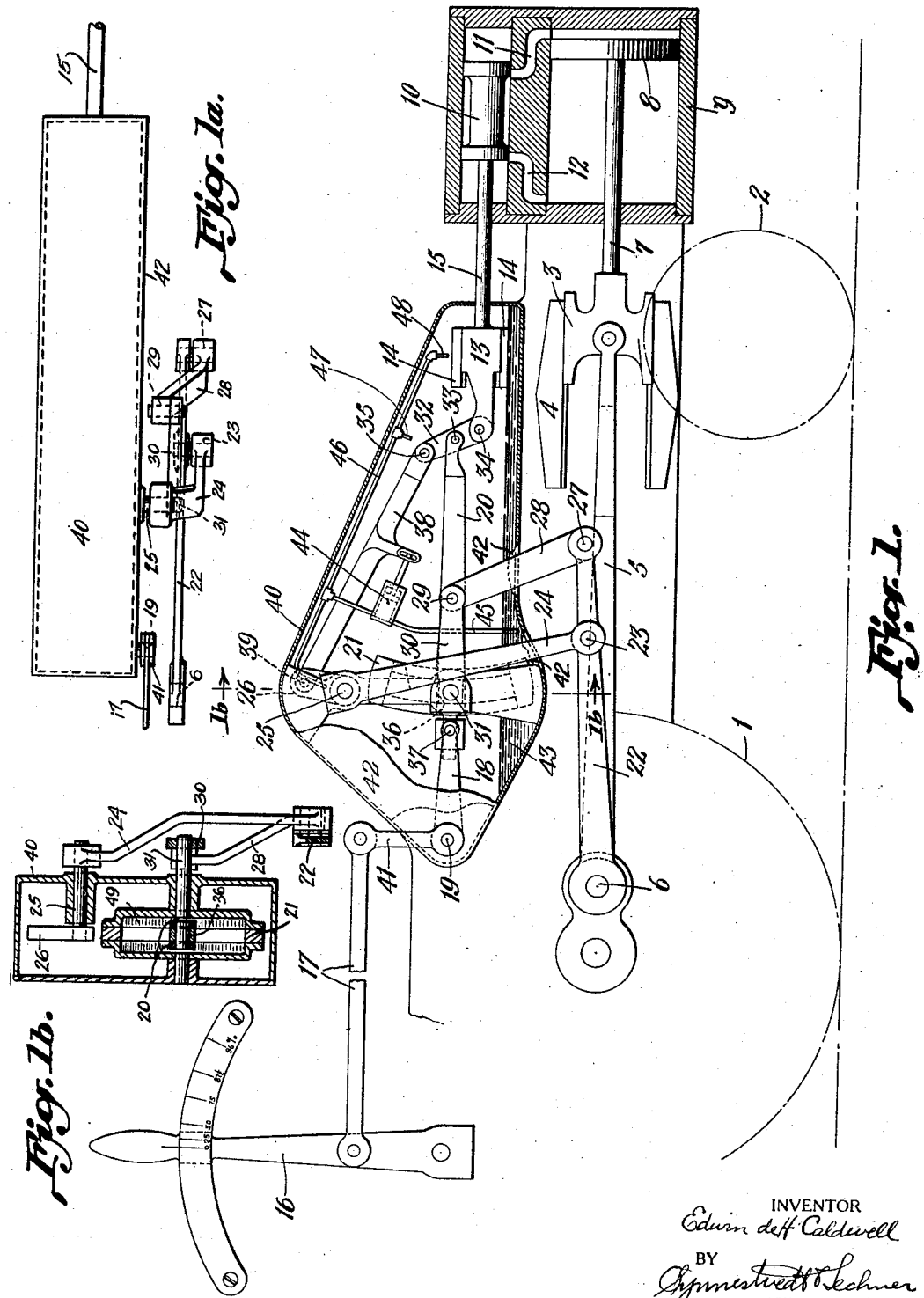
INVENTOR
Edwin de H. Caldwell
BY
ATTORNEYS July 14, 1931. E. DE H. CALDWELL 1,814,545
VALVE GEAR
Filed March 11, 1927 4 Sheets-Sheet 2

INVENTOR
Edwin de H Caldwell
BY
Synnestvedt & Lechner
ATTORNEYS

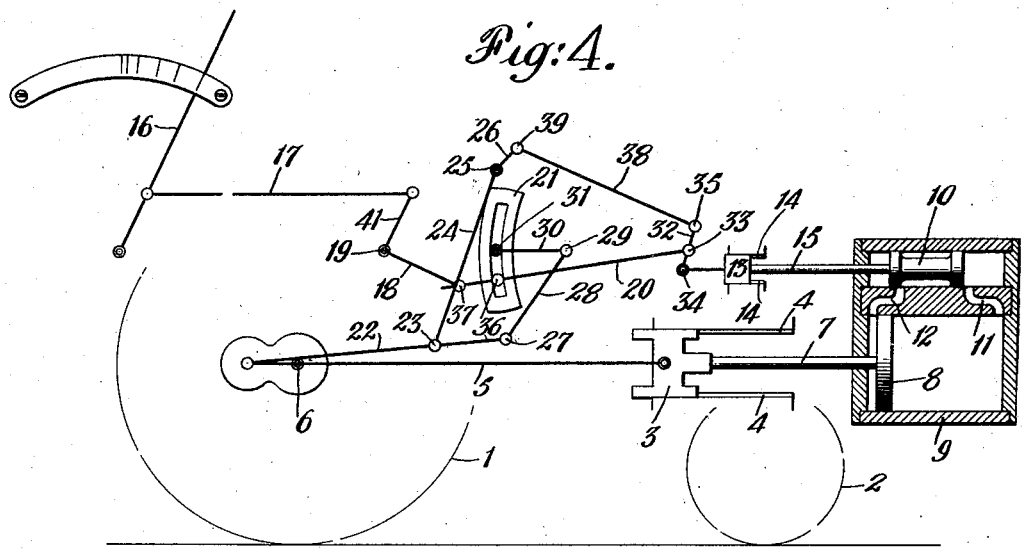
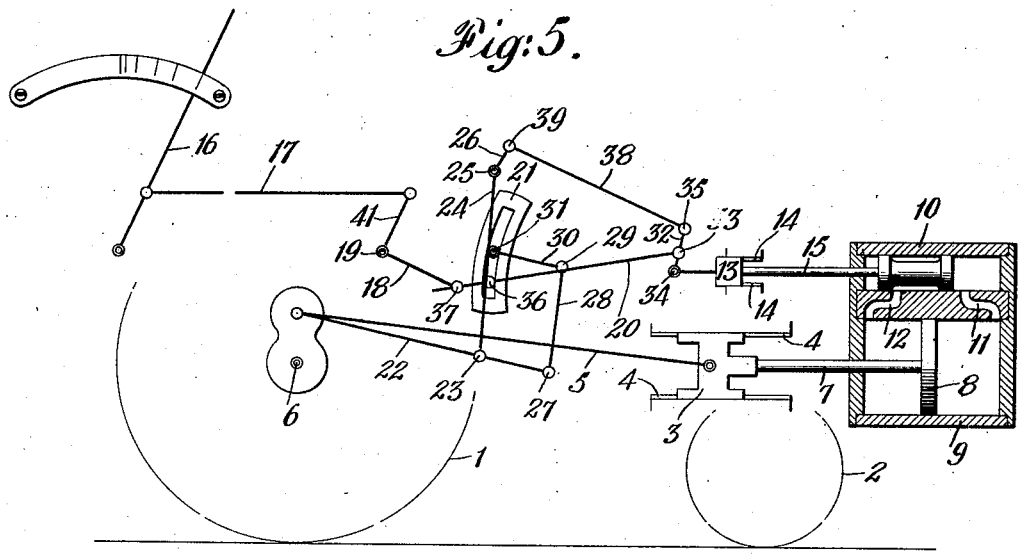

Patented July 14, 1931

1,814,545

UNITED STATES PATENT OFFICE

EDWIN DE H. CALDWELL, OF FREDONIA, NEW YORK, ASSIGNOR TO FRANKLIN RAILWAY SUPPLY COMPANY, OF NEW YORK, N. Y., A CORPORATION OF DELAWARE

VALVE GEAR

Application filed March 11, 1927. Serial No. 174,430.

This invention relates to steam engine valve gears and is particularly applicable to locomotives although it might equally well be applied to other types of engines. In the present disclosure I have illustrated the invention in a preferred form as embodied for use on a locomotive.

The primary objects of the invention are greater simplicity and at the same time the attainment of greater efficiency in the operation of the engine. In this connection I propose to eliminate the eccentric or return crank which is always difficult to locate properly as well as to keep in adjustment.

My invention also arranges for an unusually long dwell followed by a very quick cut-off of the valve. In this way the valve is opened fully quickly and also closed quickly so that the supply and exhaust of steam are not wire-drawn during the period of flow through the ports. To state this in another way I provide for an alternately fast and slow operation of the valve during its stroke so as to accomplish a quick and complete opening of the admission port to the extent that the established valve stroke permits at the beginning of each stroke of the piston and to maintain it in this fully opened position up to a point very near the cut-off.

In attaining the foregoing objects I also arrange to provide but a single connection to the driving mechanism of the engine and from this single connection to impart to the valve both the constant and the variable components of motion. Furthermore, it is an object of the invention to provide for this connection at the main crank pin.

It is also an object of the invention to give the reversing link its major movement during the vertical or up and down component of the crank pin motion and in association with this feature I arrange to impart the major movement to the lap and lead lever during the horizontal component of the crank pin motion.

More specific objects of the invention include the provision of means whereby the eccentric rod is used to supply movement for the lap and lead lever as well as for the reversing link. I also use the lap and lead lever as a swinging fulcrum for the eccentric rod and employ the movement thereby gained to impart the requisite motion to the link or other type of reversing mechanism since my invention might be applied in a situation where reversal of motion was obtained by means other than a link.

It is also an object of the invention to drive the link at the middle instead of at an end.

A still further object of the invention is to pivot the combination lever on the radius rod at a point between the valve stem connection and the lap and lead reach rod connection as will appear more fully hereinafter.

Another object of the invention is to provide a valve gear which can be suitably enclosed in an oil tight chamber thereby making possible thorough and constant lubrication.

The foregoing together with such other objects as are incident to my invention or which may appear hereinafter I attain by means of a construction which is illustrated in preferred form in the accompanying drawings, wherein Fig. 1 is a side elevation of the forward parts of the running gear of the locomotive with my invention applied thereto, the figure including a somewhat diagrammatic illustration of the parts directly associated with the valve gear and with all unnecessary parts of the locomotive omitted for the sake of clearness.

Fig. 1a is a plan view of the valve gear parts showing the connections through the casing.

Fig. 1b is a section on the line 1b—1b of Fig. 1.

Fig. 2 is a purely diagrammatic illustration of the invention as applied to a locomotive with the reverse gear in full forward motion and the main crank in its farthest right position;

Fig. 3 is a view similar to that of Fig. 2 but illustrating the positions of the parts when the main crank pin is in the lower quarter of its cycle;

Figure 6:
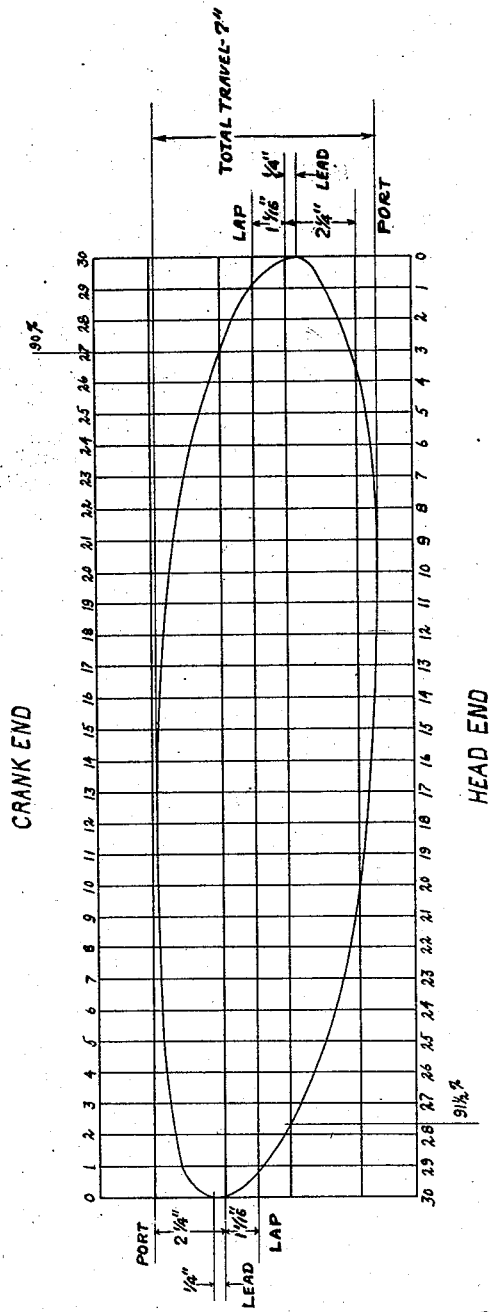

Fig. 4 continues the cycle with the main crank pin in its position farthest to the left; and Fig. 5 shows the parts with the main crank pin in the upper quarter of the cycle. In other words Figs. 2 to 5 inclusive illustrate the positions of the parts of my invention in the four quarters of one complete cycle beginning with the crank pin at the extreme right and the reverse lever in full forward motion.

Fig. 6 is a displacement curve for a valve gear mechanism embodying my invention.

By referring particularly to Fig. 1 it will be seen that I have illustrated the forward driving wheel 1 of the locomotive with the pilot wheel 2 in front. The cross head 3 is of usual construction and reciprocates between the guides 4. The main driving rod 5 connects the cross head with the main crank pin 6 and the usual piston rod 7 connects it to the piston 8 in the cylinder 9. The valve 10 is shown as of the piston type with inside admission and outside exhaust the steam passages being shown at 11 and 12. The usual valve stem cross head 13 is arranged to reciprocate in the guides 14 and the valve stem 15 connects the cross head with the valve 10.

The reverse lever 16 is shown as in its mid or neutral position where the reach rod 17 thru the medium of the lift shaft arm 18 upon the lift shaft 19 will hold the radius bar 20 in the middle of the reversing link 21.

The eccentric rod 22 is mounted directly upon the main crank pin 6 and at the point 23 intermediate its ends it is fulcrumed upon the lower end of the lap and lead lever 24, the latter in turn being mounted upon the pivot 25 above and beyond which extends the short arm 26 of said lever.

The outer end of the eccentric rod is pivotally connected at 27 to one end of a transmission bar 28 which in turn is pivotally connected at 29 to the outer end of the link arm 30. The other end of the link arm 30 is fixed to the pin 31 upon which the link 21 is arranged to oscillate. Motion of the pivot 29 upwardly and downwardly under the influence of the eccentric rod 22 thru the connections just described will actuate the link.

The locus of travel of the points 23, 27 and 29 is indicated in dotted lines in Fig. 2, but not in the balance of the figures as this is not believed to be necessary.

One end of the radius bar 20 is connected to the combination lever 32 at the pivot point 33 between the pivots 34 and 35 at the ends of the combination lever 32. Near its other end the radius bar 20 is mounted in the link block 36 which latter is adapted to be moved upwardly or downwardly between the guides 49 in the link 21 in a manner well understood in this art.

Any suitable pivotal connection 37 capable of giving at the same time a sliding connection between the end of the lift shaft arm 18 and the end of the radius bar 20 can be used to couple said lift shaft arm to said radius bar.

The valve stem cross head 13 is coupled to the combination lever at the pivot 34 and the lap and lead reach rod 38 is connected to the combination lever at the pivot 35 the other end of this rod being connected to the short arm 26 of the lap and lead lever at the pivot 39..

All of the valve gear parts just described are enclosed within the oil tight casing 40 with the exception of the transmission bar 28, the link arm 30, the long arm 24 of the lap and lead lever and the crank arm 41 of the lift shaft arm 18, all of which latter are in a plane to the outside of the cover member 42 for the housing 40, the cover member 42 being shown broken away in order to disclose the parts within. The only parts which project thru the casing 40 or its cover 42 are the valve stem 15 at one end which reciprocates horizontally thru the casing 40 and can be suitably packed in any desired manner; the pin forming the pivot at 25; the pin forming the pivot at 19 and the pin at pivot 31 as more clearly shown in Fig. 1a. It will be seen that all of these pins project laterally thru the cover member 42.

It is therefore possible to maintain a bath of oil 43 in the lower portion of the casing 40 and to provide any suitable pumping mechanism for circulating this oil to the various working parts of the valve gear. To accomplish this I have illustrated a small pump 44 which is connected to, and therefore driven by the motion of, the lap and lead reach rod 38, the oil being taken up thru the pipe 45 and distributed thru the pipes 46, 47 and 48. In this way I can arrange to have the valve gear parts operating in a continuous bath of oil, a feature which is of great importance in attaining efficient and quiet operation and long life of the parts. This has not been possible with other types of valve gears heretofore known because of the necessity for providing large slotted openings in the bottom wall of the casing 40 had it been proposed to provide such an oil chamber around the valve gear.

The operation of the valve gear is as follows: Assuming that the locomotive is being run forwardly and that the reverse lever 16 is in the corner or full gear position as shown in Fig. 2, it will be seen that in this figure the main crank pin 6 is at its extreme right-hand position with the piston 8 just about to begin its return stroke to the rear of the cylinder 9. The port 11 is just opening to live steam and the port 12 is already open to exhaust. The link block 36 is in the lower portion of the link 21 and the long arm 24 of the lap and lead lever is at its extreme right-hand position. By the time the main crank pin 6 has reached the position shown in Fig. 3, the eccentric rod 22 has been rocked upon the fulcrum 23 so as to impart the major motion to the link 21 thru the medium of the transmission rod 28 and link arm 30. The valve 10 is moved still farther forwardly and the port 11 uncovered. In Fig. 4 the main crank pin 6 has reached its extreme left-hand position with the piston ready to begin its forward stroke. The valve has travelled all the way back and is just beginning to uncover the port 12 to live steam, the port 11 already being open to exhaust. In Fig. 5 three quarters of a revolution has been completed and the valve has moved to completely uncover the port 12 to live steam and is on its way back again to the other end so as to be ready for a repetition of the cycle as it began in Fig. 2.

It will be seen from an examination of the drawings that I have secured a very long valve travel with a minimum possibility of distortion in the steam distribution. One of the chief means by which I get this long valve travel is by pivoting the combination lever 32 on the end of the radius rod 20 at a point between the valve stem connection 34 and the lap and lead reach rod connection 35.

I desire to call attention to the fact that in a reversible valve gear I have secured the angle of advance necessary for proper steam distribution by using only one point of the running gear on one side of the locomotive to produce both the vertical and the horizontal motions. Furthermore this single connection is made directly at the crank pin 6 without the necessity of using a return crank.

The long dwell and the quick cut-off which is secured is almost the equivalent of the motion which could be secured by the use of a cam. This prevents wire drawing of the steam thru the ports. The reversing link receives its major movement during the vertical or up and down component of the crank pin motion while at the same time the lap and lead lever receives its major movement during the horizontal component of the crank pin motion. In other words I hold the link and therefore the valve almost stationary in its extreme off-center positions during the major portion of the horizontal component of motion of the crank pin and impart to the link and the valve the major movement during the up and down component of the motion of the crank pin. The eccentric rod is used to supply movement for the lap and lead lever as well as for the link, the lap and lead lever being used as a fulcrum for the eccentric rod.

Fig 6 is a valve displacement curve of customary character with the reverse gear in the corner, showing the piston stroke in inches, the crank end appearing above the line XY and the head end below, as indicated by the legends. The lap and the lead as well as the port opening and the length of valve travel are all indicated in the usual manner as shown by appropriate legends.

The curve of this figure was taken from a handmade wooden model of applicant's device and undoubtedly contains some inaccuracies because of unavoidable crudities in construction, but it will serve to illustrate the fact that applicant obtains a long dwell and a comparatively quick cut-off of the valve, cut-off at the crank end taking place, in fact, at 90% of the piston stroke and at the head end at 91½% of the piston stroke, as shown.

Attention is directed to the fact that the structural features of the present disclosure which relate to the housing and lubrication of the valve gear are claimed in my divisional copending application Serial No. 299,910, filed August 16, 1928.

I claim:—

1. In a valve gear, the combination with the main crank pin for driving the locomotive, of an eccentric rod pivoted thereon, a reversing link, a valve stem, a combination lever pivoted at one end to the valve stem, a lap and lead lever, a reach rod connecting the short arm of the lap and lead lever to the other end of the combination lever, a radius rod having one end pivoted to the combination lever at a point between its ends and having its opposite end mounted for sliding movement in the reversing link, actuating mechanism for the link pivoted to the eccentric rod, and a pivotal connection between the long arm of the lap and lead lever and the eccentric rod.

2. In a valve gear, the combination with the main crank pin for driving the locomotive, of an eccentric rod pivoted thereon, a reversing link, a valve stem, a combination lever pivoted at one end to the valve stem, a lap and lead lever having its short arm connected to the other end of the combination lever, a radius rod having one end pivoted to the combination lever at a point between its ends and having its opposite end connected to said reversing link, actuating mechanism for the link pivoted to the eccentric rod and a pivotal connection between the long arm of the lap and lead lever and the eccentric rod.

3. In a valve gear, the combination with the main crank pin for driving the locomotive, of an eccentric rod pivoted thereon, a reversing link, a valve stem, a combination lever pivoted at one end to the valve stem, a lap and lead lever, a reach rod connecting the short arm of the lap and lead lever to the other end of the combination lever, a radius rod having one end pivoted to the combination lever at a point between its ends and having its opposite end mounted for sliding movement in the reversing link, actuating mechanism for the link pivoted to the eccentric rod, and a pivotal connection between the long arm of the lap and lead lever and the eccentric rod, said last mentioned pivot being located between the crank end of the eccentric rod and the pivot for the reversing link actuating mechanism.

4. In a valve gear, the combination with the main crank pin for driving the locomotive, of an eccentric rod pivoted thereon, a valve stem, a combination lever pivoted at one end to the valve stem, a lap and lead lever having its short arm connected to the other end of said combination lever, a pivotal connection between the long arm of the lap and lead lever and said eccentric rod, a reversing link, a radius rod having one end pivoted to the combination lever at a point between its ends and having its opposite end slidably connected to said link, and actuating mechanism for the link pivoted to said eccentric rod beyond the pivot for the lap and lead lever.

In testimony whereof I have hereunto signed my name.

EDWIN DE H. CALDWELL.